Aug. 19, 1930.　　　J. W. MILNOR ET AL　　　1,773,370
REDUCING INTERFERENCE IN SUBMARINE CABLES
Filed Jan. 8, 1927
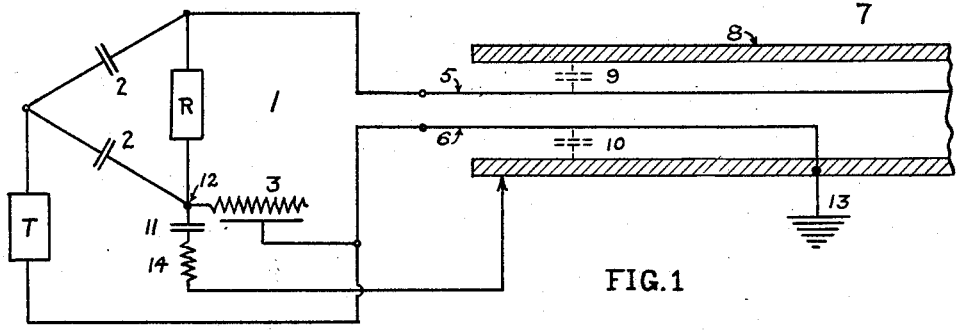
FIG.1
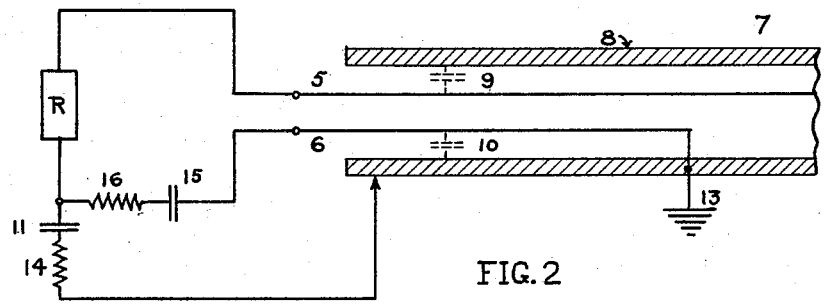
FIG.2
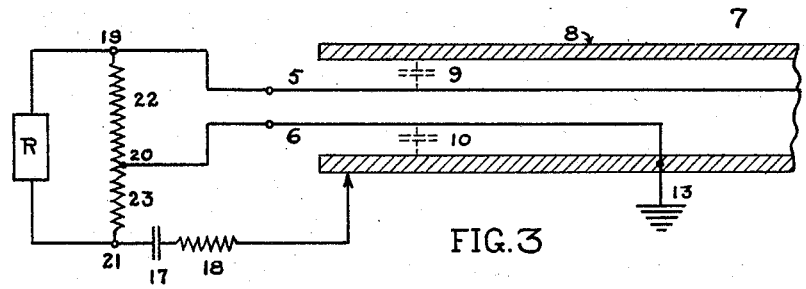
FIG.3
FIG.4
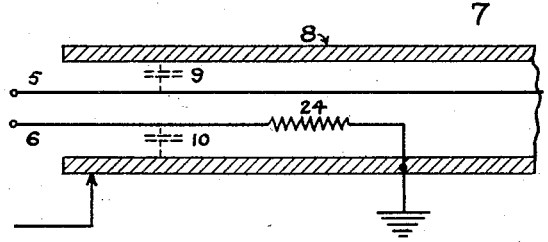
INVENTORS
J.W. MILNOR
C.H. CRAMER
BY *Eugene C. Brown*
ATTORNEY Patented Aug. 19, 1930

1,773,370

UNITED STATES PATENT OFFICE

JOSEPH W. MILNOR, OF MAPLEWOOD, NEW JERSEY, AND CLIFFORD H. CRAMER, OF LITTLE NECK PARK, NEW YORK, ASSIGNORS TO THE WESTERN UNION TELEGRAPH COMPANY, OF NEW YORK, N. Y., A CORPORATION OF NEW YORK

REDUCING INTERFERENCE IN SUBMARINE CABLES

Application filed January 8, 1927. Serial No. 159,943.

This invention relates to means for preventing electrical interference in signaling systems, and especially for preventing a form of interference which arises in telegraph systems employing ocean cables.

It is an object of the invention to prevent the deleterious effect at the receiving apparatus of unbalanced disturbing currents arising within the system by reason of the capacitive relation existing between structural parts of the system.

More particularly, it is an object of the invention to provide neutralization of the static induction picked up from the cable sheath within a short distance from the cable station.

Among the disturbances affecting a submarine cable are those due to the operation of electrical systems in the locality of the landing point of the cable. It has been determined experimentally that the greater part of this disturbance may be picked up by the cable circuit in the section of cable adjacent to the operating station and extending a short distance to sea.

The manner in which the cable is affected by such disturbance will be explained in connection with the attached drawings, in which Fig. 1 is a schematic drawing showing a conventional duplex cable circuit with the interference neutralizing means of our invention applied thereto;

Figs. 2 and 3 illustrate two ways in which this invention may be applied to a simplex circuit;

Fig. 4 shows how the invention may also be applied to a cable circuit in which the sea earth conductor is terminated in an impedance instead of being connected directly to ground.

The same references denote similar parts in all the figures.

Fig. 1 shows diagrammatically the ordinary terminal connections for duplex operation of a cable circuit, wherein the receiving apparatus R, at station 1, is connected across the ratio arms, herein shown as comprising the block or bridge condensers 2, 2, and the transmitting apparatus T is connected, on the one side, to the connecting point of the ratio arms, and, on the other side, to ground. The artificial line 3, which usually has an impedance approximately equal to the cable impedance, balances the cable circuit with respect to transmitted signal impulses, in the manner well known in the art.

The cable conductor 5 and the sea earth conductor 6 at the shore end section 7 of the submarine cable and any underground cables that may connect the submarine cable with the cable station, are, however, subject to disturbing currents arising by reason of the electrostatic capacity which exists between each of them and the cable armour or sheath 8. These capacities are represented respectively by condensers 9 and 10, shown in dotted lines on the drawing. It is to be understood, however, that this representation is purely symbolic since such capacity is normally uniformly distributed throughout the paralleling length of the cable sheath and cable conductors.

The drawing also shows a neutralizing capacity 11 and resistance 14, connected between the head of the artificial line 12 and the armour of the cable.

When there is any electrical disturbance in the earth in the locality of the cable 7, the armour or sheath 8 is affected by this disturbance and tends to cause a disturbing current to flow into the cable and sea earth conductors by way of capacities 9 and 10. Since the impedance of the sea earth conductor to ground through 13 is usually low, the disturbing current in this conductor will mostly flow to ground through the sea earth 13 without affecting the receiving apparatus R. The cable conductor, however, has a relatively high impedance to ground, and since the artificial line 3 has an impedance approximately equal to the cable impedance, the disturbing current flowing into the cable conductor will divide approximately equally, half of it flowing from the cable conductor to ground, at sea, and half flowing back through the receiving apparatus R, artificial line 3 and sea earth conductor 6 to ground.

If a neutralizing capacity 11 and resistance 14 be connected between the head of the artificial line 12 and the armour or sheath 8 of the cable, a neutralizing current may be made to flow from the disturbed armour or sheath through capacity 11 and resistance 14 to point 12, where it will divide, half flowing through the artificial line and the sea earth conductor to ground, and half through the receiving apparatus R and cable conductor 5 to ground. If capacity 11 and resistance 14 are adjusted to the proper values, the neutralizing current through the receiving apparatus caused by this circuit will be equal in magnitude and opposite in direction to the disturbing current caused by the capacity 9, thus neutralizing the effect of the disturbance on the receiving apparatus. Capacity 11 will usually be approximately equal to capacity 9, and resistance 14 will usually be low.

Although the neutralizing device has been described above in connection with a duplex cable circuit, it will work equally well on a simplex circuit, i. e., a circuit operated in one direction only. Fig. 2 shows the manner in which this invention may be applied to a simplex circuit. In this figure capacity 15 and resistance 16, having an impedance preferably approximately equal to the characteristic cable impedance, are connected between the sea earth conductor and the receiving apparatus. Capacity 11 and resistance 14 form the neutralizing circuit and function in the same manner as described in connection with Fig. 1.

A second method by which the disturbance may be neutralized on a simplex circuit is shown in Fig. 3, in which the cable and sea earth conductors are terminated at points 19 and 20 in a resistance or impedance 22, forming one arm of a bridge arrangement, of which resistance or impedance 23 forms a second arm, capacity 9 a third arm, and the neutralizing circuit composed of capacity 17 and resistance 18, the fourth arm. The receiving apparatus is connected across the diagonal of the bridge to points 19 and 21. With capacity 17 and resistance 18 adjusted to the proper values, dependent partly upon the ratio of impedances 22 and 23, the potential across impedance 23 caused by the neutralizing current made to flow through capacity 17 and resistance 18, will be equal and opposite to that across impedance 22 caused by the disturbing current flowing through capacity 19. Under these conditions there will be no disturbing potential between points 19 and 21, and the receiving apparatus will not be affected.

The invention, as illustrated in Figs. 1, 2 and 3, may also be applied to a cable circuit in which the sea earth conductor is terminated in an impedance 24. This is indicated in the fragmentary showing of Fig. 4. The manner of connecting the signaling apparatus and the neutralizing condenser and resistance will be apparent from the previous figures; however, a somewhat different adjustment of the neutralizing condenser and resistance would obviously be necessary in this case.

While all of the above applications of the device have been described in connection with a cable circuit in which a sea earth is used, it may be applied with equal success to a cable circuit in which a local earth is used for operation of the cable, with the sea earth conductor eliminated.

Although this device has been described in connection with the neutralization in cable circuits of disturbances due to the operation of electrical systems, it may also be used in reducing the effect of other extraneous disturbances to which all submarine cables are subjected.

It is to be understood that the invention is not limited to the particular circuits herein shown and described as various modifications in details may be made without departing from the spirit of the invention.

What we claim is:

1. A signaling system comprising a submarine cable, terminal signaling apparatus therefor, a conductor connecting said cable with one terminal of said terminal apparatus, a second conductor connected to the other terminal of said apparatus and extending within the cable sheath parallel to said first conductor to a point at sea and grounded thereat, and means connecting the sheath and said other terminal adapted to supply a potential to neutralize disturbing currents induced between the sheath and the cable.

2. A signaling system comprising a submarine cable, terminal signaling apparatus therefor, a conductor connecting said cable with one terminal of said terminal apparatus, a second conductor connected to the other terminal of said apparatus and extending within the cable sheath parallel to said first conductor to a point at sea and grounded thereat, the impedance of said ground connection being substantially zero, and a condenser connected between said sheath and said terminal apparatus.

3. The combination with a submarine cable, a receiver, a conductor connecting said cable with one terminal of said receiver, a ground at sea connected with the other terminal of said receiver through a long conductor paralleling the cable at its shore end within the cable sheath, the impedance of said ground connection differing substantially from the impedance of said first conductor, and a condenser in series with a resistance connected between the sheath and said receiver.

4. A signaling system comprising a submarine cable, terminal apparatus therefor, a conductor of said cable connected to a terminal of said apparatus, and means adapted to supply a potential to neutralize the disturbing currents induced between the sheath and said conductor, said means connecting the sheath of said cable and said apparatus.

5. A signaling system comprising a submarine cable, terminal apparatus therefor, a conductor of said cable connected to a terminal of said apparatus, and means adapted to supply a potential to neutralize the disturbing currents induced between the sheath and said conductor, said means embodying a series-connected capacity and resistance connecting the sheath of said cable and said apparatus.

In testimony whereof we affix our signatures.

JOSEPH W. MILNOR.
CLIFFORD H. CRAMER.